No. 643,922. Patented Feb. 20, 1900.
W. F. TREXLER.
BRAKE.
(Application filed Aug. 5, 1899.)
(No Model.)
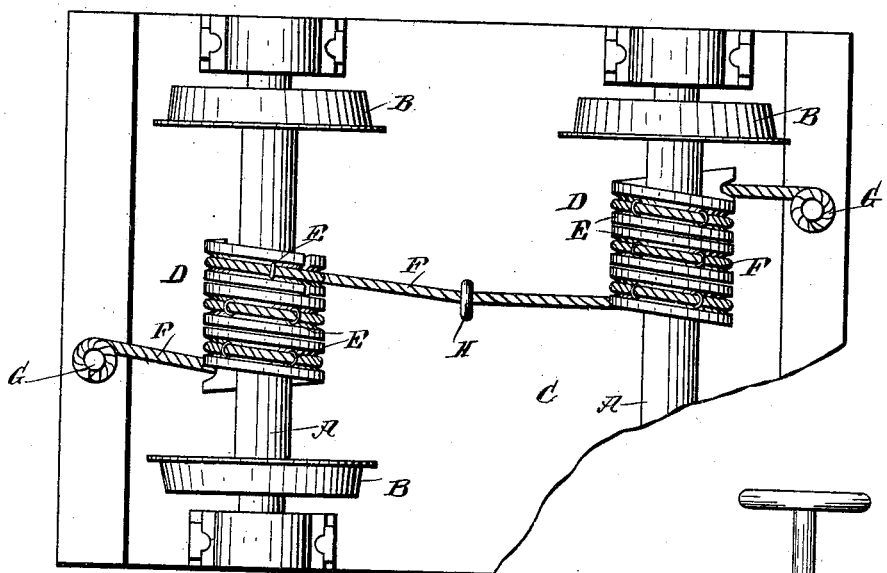
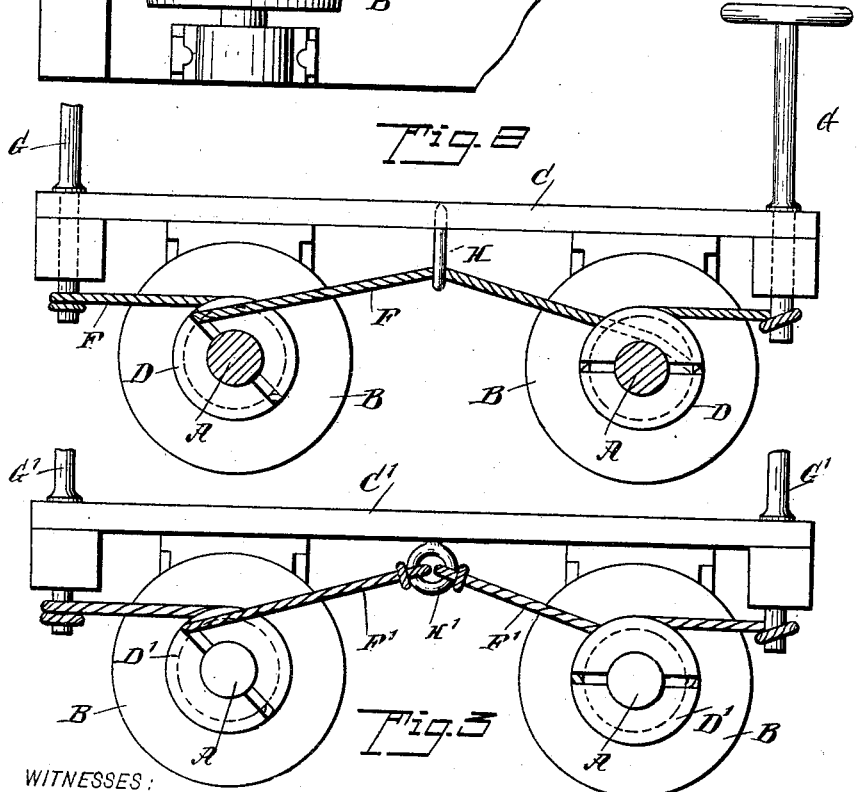
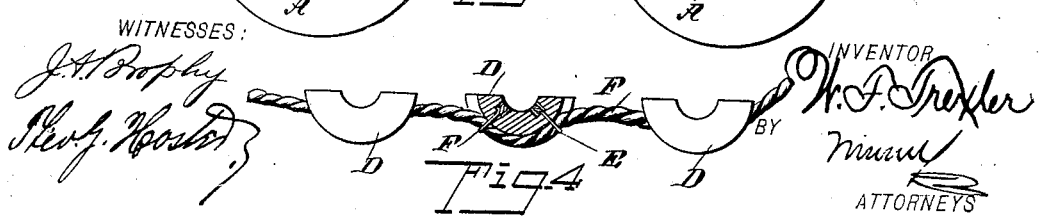
WITNESSES:
INVENTOR
W. F. Trexler
BY
ATTORNEYS

UNITED STATES PATENT OFFICE.

WILLIAM F. TREXLER, OF ALLENTOWN, PENNSYLVANIA, ASSIGNOR OF ONE-HALF TO ALFRED J. YOST, LEO WISE, GEROLD J. S. KOHLER, AND FRANKLIN T. L. KEITER, OF SAME PLACE.

BRAKE.

SPECIFICATION forming part of Letters Patent No. 643,922, dated February 20, 1900.

Application filed August 5, 1899. Serial No. 726,276. (No model.)

*To all whom it may concern:*

Be it known that I, WILLIAM F. TREXLER, of Allentown, in the county of Lehigh and State of Pennsylvania, have invented a new and Improved Brake, of which the following is a full, clear, and exact description.

The object of the invention is to provide a new and improved brake which is simple and durable in construction, very effective in operation, and designed for use on street and railway cars and other vehicles, also on drums, wheels, and like rotary devices requiring braking, the brake being arranged to permit of conveniently, quickly, and thoroughly braking the rotating part without much exertion on the part of the operator.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 1 is an inverted plan view of the improvement as applied to a car. Fig. 2 is a side elevation of the same with the axles in section. Fig. 3 is a like view of a modified form of the same; and Fig. 4 is a side elevation, with part in section, of the brake-rope with the brake in an extended position.

The brake illustrated in the drawings is applied on the axles A, carrying the wheels B, and journaled in suitable bearings on the body C of the vehicle, so that the axles A rotate when the vehicle moves forward or backward. On each of the axles A is arranged a brake-shoe D, made cylindrical in form and in sections, with a central bore, the wall of which is adapted to engage and brake the peripheral surface of the corresponding axle. Each shoe D is formed in its sections with a peripheral spiral groove, and two sections are necessary for one complete turn of the spiral, and on the peripheral faces of the sections are secured eyes E for holding the brake rope, chain, or cable F in the spiral groove of the several sections for a brake-shoe, as will be readily understood by reference to the drawings. Thus the brake-rope F carries the several sections, and when extended, as shown, for instance, in Fig. 4, the sections appear spaced one from the other.

As illustrated in Figs. 1 and 2, the brake-rope F passes from one brake-shoe to the other, and the ends of said brake-rope wind on brake-staffs G, mounted to turn at the ends of the vehicle-body and under the control of the operator. The portion of the rope between the two brake-shoes is preferably passed through a guide H, attached to the under side of the vehicle-body.

Now it is evident that when either of the brake-staffs G is turned by the operator and the corresponding end of the rope F is wound up then pressure is exerted against the several sections of each brake-shoe to draw said shoes in contact with the revolving axles, so that the axles are braked, and consequently the vehicle is also braked. When the staff G is turned in an opposite direction and the corresponding end of the rope F unwinds, then the brake-shoe sections are relieved of pressure from the rope, and consequently no frictional braking effect is had by the shoes on the axles.

Each axle may be separately or independently braked, if desired. For instance, as indicated in Fig. 3, two brake-ropes F' are employed, each brake-rope having its inner end fixed to a part H' on the vehicle-body C', the outer ends of the ropes winding on the brake-staffs G'. The brake-shoes D' are similar to the brake-shoes D above described; but each brake-shoe D' is independently actuated from the corresponding brake-staff G'.

From the foregoing it is evident that other rotating parts besides vehicle-axles and the like may be readily braked by the construction described, it being understood, however, that the essential part of my invention consists of the normally-loose brake-shoes on the rotating part, the shoes being made in sections carried by a rope, chain, or cable under the control of the operator for drawing the shoe-sections upon the rotating part.

Having thus fully described my invention,

I claim as new and desire to secure by Letters Patent—

1. The combination with the shaft, of a cable wound with a plurality of revolutions about said shaft, and a brake-shoe constructed of independent sections loosely mounted on the shaft and having spiral grooves on their peripheries in which the cable is secured, the said sections being of such a number that some of them will lie alongside of others when the cable is wound on the shaft, whereby tension on the cable will bind the sections on the shaft and force them laterally against each other, as set forth.

2. The combination with a shaft, of a cable wound around said shaft, and a brake-shoe constructed in sections formed with spiral grooves on their peripheries in which said cable is secured, a pair of sections being required for one revolution of the spiral, and there being provided a plurality of pairs, whereby a tension on the cable will tend to bind the sections on the shaft and force them laterally against each other, as and for the purpose set forth.

WILLIAM F. TREXLER.

Witnesses:
W. B. FOGLEMAN,
HARRISON BORTZ.